United States Patent
Geiger et al.

[11] Patent Number: 6,069,887
[45] Date of Patent: May 30, 2000

[54] METHOD AND SYSTEM FOR SYNCHRONIZATION IN A WIRELESS LOCAL AREA NETWORK

[75] Inventors: Edward W. Geiger, San Marten; Stanley L. Fickes, San Jose; Richard W. Mincher, San Jose; Jeffrey L. Mullins, San Jose, all of Calif.

[73] Assignee: Apple Computer, Inc., Cupertino, Calif.

[21] Appl. No.: 08/864,101

[22] Filed: May 28, 1997

[51] Int. Cl.⁷ ........................................... H04J 3/06
[52] U.S. Cl. .................. 370/338; 370/349; 370/350; 370/353
[58] Field of Search .................... 370/324, 328, 370/329, 338, 345, 349, 350, 353, 503, 507, 509; 375/356

[56] References Cited

U.S. PATENT DOCUMENTS

| | | | |
|---|---|---|---|
| 5,408,506 | 4/1995 | Mincher et al. | 375/356 |
| 5,509,027 | 4/1996 | Vook et al. | 375/356 |
| 5,517,505 | 5/1996 | Buchholz et al. | 370/350 |
| 5,583,866 | 12/1996 | Vook et al. | 370/329 |
| 5,751,702 | 5/1998 | Evans et al. | 370/350 |
| 5,875,179 | 2/1999 | Tikalsky | 370/350 |

*Primary Examiner*—Min Jung
*Attorney, Agent, or Firm*—Sawyer Law Group LLP

[57] ABSTRACT

Aspects for achieving and utilizing synchronization among end stations in a wireless local area network (WLAN) are provided. In a method aspect, the method includes receiving a packet with a time synchronization field value from a first end station in a second end station of a communication group. The method further includes comparing upon receipt of the packet the time synchronization field value with a local time value in the second end station to determine whether the local time value requires updating to maintain synchronization between the first and second end stations. The comparing further determines whether a difference between the time synchronization field value and the local time value is greater than zero, and when the difference is greater than zero, the local time value is updated to the time synchronization field value. In a system aspect, the system includes at least two end stations, wherein each of the at least two end stations further includes a local clock unit, and a transmit/receive control unit coupled to the local clock unit. A time synchronization field register in the transmit/receive control unit stores a value of the local clock unit, with one of the at least two end stations comparing a time synchronization field register value of a packet upon receipt from another of the at least two end stations with a value of the local clock unit to determine whether updating of the local clock unit is necessary.

21 Claims, 6 Drawing Sheets

METHOD AND SYSTEM FOR SYNCHRONIZATION IN A WIRELESS LOCAL AREA NETWORK

FIELD OF THE INVENTION

The present invention relates to wireless local area networks (WLANs) and more particularly to synchronization of units within a WLAN.

BACKGROUND OF THE INVENTION

The ability of computer users to access programs and share data through local area networks (LANs) has become a readily expected part of most working environments. The improved efficiency within a particular LAN environment is often enhanced with the convenience of remotely accessing the LAN. An important extension to LANs is the provision of a wireless LAN (WLAN).

In a WLAN, end station units suitably employ radio communication using an FCC allotted frequency band of 2400 MHz (megaHertz) to fulfill performance expectations of wired LANs but without costly wire installation. One example of a WLAN is illustrated in FIG. 1. As shown, three end station units 10, 12, and 14 are in range with one another and have formed a portion of a WLAN 16. Also included in WLAN 16 is an access point station 18 that can access both connection oriented and connection-less services. Access point station 18 thus may support connection to both a local Ethernet backbone and some form of telecommunication transport, such as ISDN, ATM, or T1, as is well appreciated by those skilled in the art.

With the inclusion of connection oriented stations within a WLAN, the connection oriented services provide a potential mechanism for reserving bandwidth, such as for real-time or time-bounded data transfers, which may require a high data transfer rate. The connection-less services suitably provide typical asynchronous access to the medium in an fashion similar to Ethernet. Potential contention among varying unit types for communication in the WLAN raises significant issues for consideration in the development of standards for the WLAN. Included in these issues are how units will synchronize among themselves and how reserving bandwidth occurs.

In the prior art, attempts to solve LAN time synchronization problems include designations of one or more end station units/nodes as masters. In a single-master LAN, one node is designated as the master node and the clock of the designated node is utilized as the timing standard for every other node connected to the network. This requires the master node to periodically send a special time synchronization message to all other nodes within the network. Thus, all nodes in a single-master system must be capable of receiving messages from the master.

In general, on any wireless LAN, electrical noise and interference, coupled with signal attenuation effects corresponding to node separation distances, signal path obstacles, or multipath fading arising from signal reflections, preclude continuous reliable communication between a node and another specified node. Since each node within a single-master LAN system must be able to communicate with the master node, a single-master LAN system does not allow the flexibility in a wireless LAN environment.

Another problem associated with single-master LAN systems pertains to the master node recovering from a temporary communication problem. If a new master node has been selected during a time interval in which the original master node could not communicate, the LAN will have two master nodes after the original master node's recovery. Synchronization differences between the two master nodes results in conflicting synchronization being sent over the LAN.

In a multiple-master LAN, two or more nodes serve as masters for time synchronization purposes. Nodes within this type of LAN collect synchronization messages from each master at regular intervals, and typically calculate a corresponding average correct time. This requires each node to have the capability to communicate with at least one master node. As discussed above, in a wireless LAN environment, reliable communication between two specific nodes is not always possible. Thus, multiple-master systems are also undesirable for wireless LANs.

An attempt to provide time synchronization in a wireless LAN environment is described in U.S. Pat. No. 5,408,506. In this patent, each node is capable of transmitting and receiving information from at least one other node through frequency hopping spectrum communication. Time information is incorporated into all messages transferred between nodes by incorporating a value from the node's local clock into a message. A node is capable of receiving any message transmitted from other nodes within a predetermined receiving distance, regardless of whether or not the data in the message is addressed to the node. Upon message receipt, the receiving node stores the message header and the value of its local clock. The receiving node's virtual master clock processor then uses the time information contained within the message to calculate the time difference between the sending node's local clock and its local clock value. Prior to frequency hopping to another channel, a node's virtual master clock processor averages all determined time differences since the previous frequency hop, thereby creating a virtual master clock value corresponding to the average of the local clock values for all nodes from which messages were received. The virtual master clock processor then uses this average to adjust the node's local clock value to maintain synchronization.

While this method does produce synchronization within a wireless LAN, the need to store clock values from all the transmitted packets within a predetermined range is cumbersome. Further, tracking of the number of packets received to determine an average adds to processing overhead. Accordingly, a need exists for a time synchronization technique for a wireless LAN that is effective and efficient through utilization of more straightforward synchronized time value determination procedures.

SUMMARY OF THE INVENTION

Accordingly, the present invention meets these needs and provides method and system aspects for achieving synchronization in a WLAN.

In a method aspect, the method includes receiving a packet with a time synchronization field value from a first end station in a second end station of a communication group. The method further includes comparing upon receipt of the packet the time synchronization field value with a local time value in the second end station to determine whether the local time value requires updating to maintain synchronization between the first and second end stations. The comparing further determines whether a difference between the time synchronization field value and the local time value is greater than zero, and when the difference is greater than zero, the local time value is updated to the time synchronization field value.

In a system aspect, the system includes at least two end stations, wherein each of the at least two end stations further includes a local clock unit, and a transmit/receive control unit coupled to the local clock unit. A time synchronization field register in the transmit/receive control unit stores a value of the local clock unit, with one of the at least two end stations comparing a time synchronization field register value of a packet upon receipt from another of the at least two end stations with a value of the local clock unit to determine whether updating of the local clock unit is necessary.

With the present invention, synchronization between units in a WLAN is efficiently achieved. A time synchronization field within transmitted packets is effectively utilized in synchronizing units of a communication group without requiring excessive data storage or maintenance of communication with a master node. Further, synchronization is enhanced through utilization of predetermined time points to accommodate varying types of data and units, including reserve bandwidth data and power-saving units. These and other advantages of the aspects of the present invention will be more fully understood in conjunction with the following detailed description and accompanying drawings.

DETAILED DESCRIPTION

Figure 1:
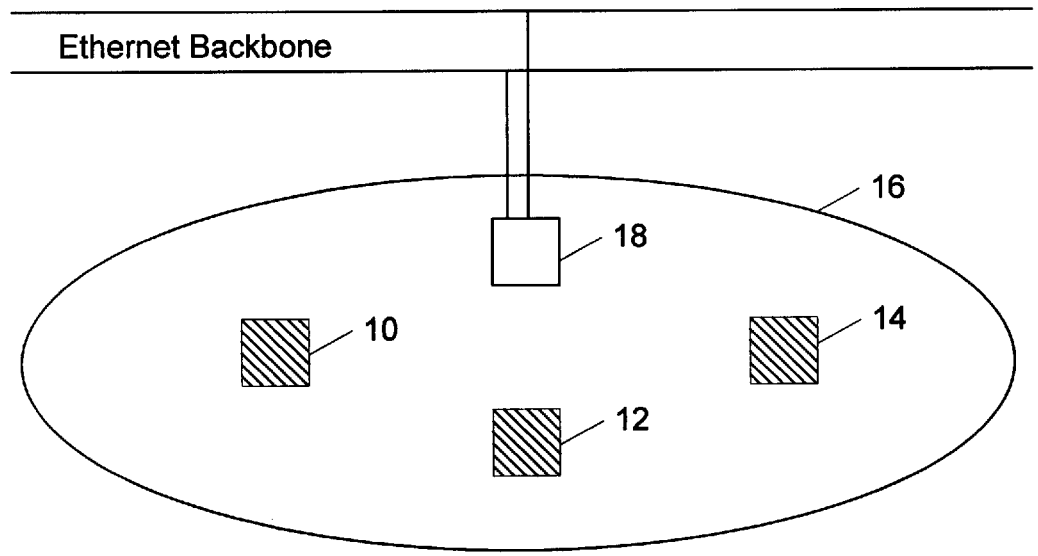
FIG. 1 illustrates a general diagram of a WLAN.

The present invention relates to synchronization of end stations in a WLAN. The following description is presented to enable one of ordinary skill in the art to make and use the invention and is provided in the context of a patent application and its requirements. Various modifications to the preferred embodiment and the generic principles and features described herein will be readily apparent to those skilled in the art. Each end station unit/node within the WLAN of FIG. 1 suitably comprises a computer system with an architecture illustrated in the block diagram of FIG. 2. The computer system 150 preferably comprises a display device 152, a CPU 154, random access memory (RAM) 156, read-only memory (ROM) 158, a printer or hard copy device 160, an input device 162, a data storage device 164, a transmitter/receiver 166, a common data pathway/bus 168, an antenna 170 coupled to the transmitter/receiver 166, a local clock 172, and a transmit/receive control unit 174. Suitably, transmit/receive control unit 174 may be provided with transmitter/receiver 166 as a separate PCB (printed circuit board) in the computer system 150 and include control logic in ASIC form, along with RAM and ROM for providing storage registers and programmed operations, including operations for sending and receiving data and synchronizing units.

Figure 3:
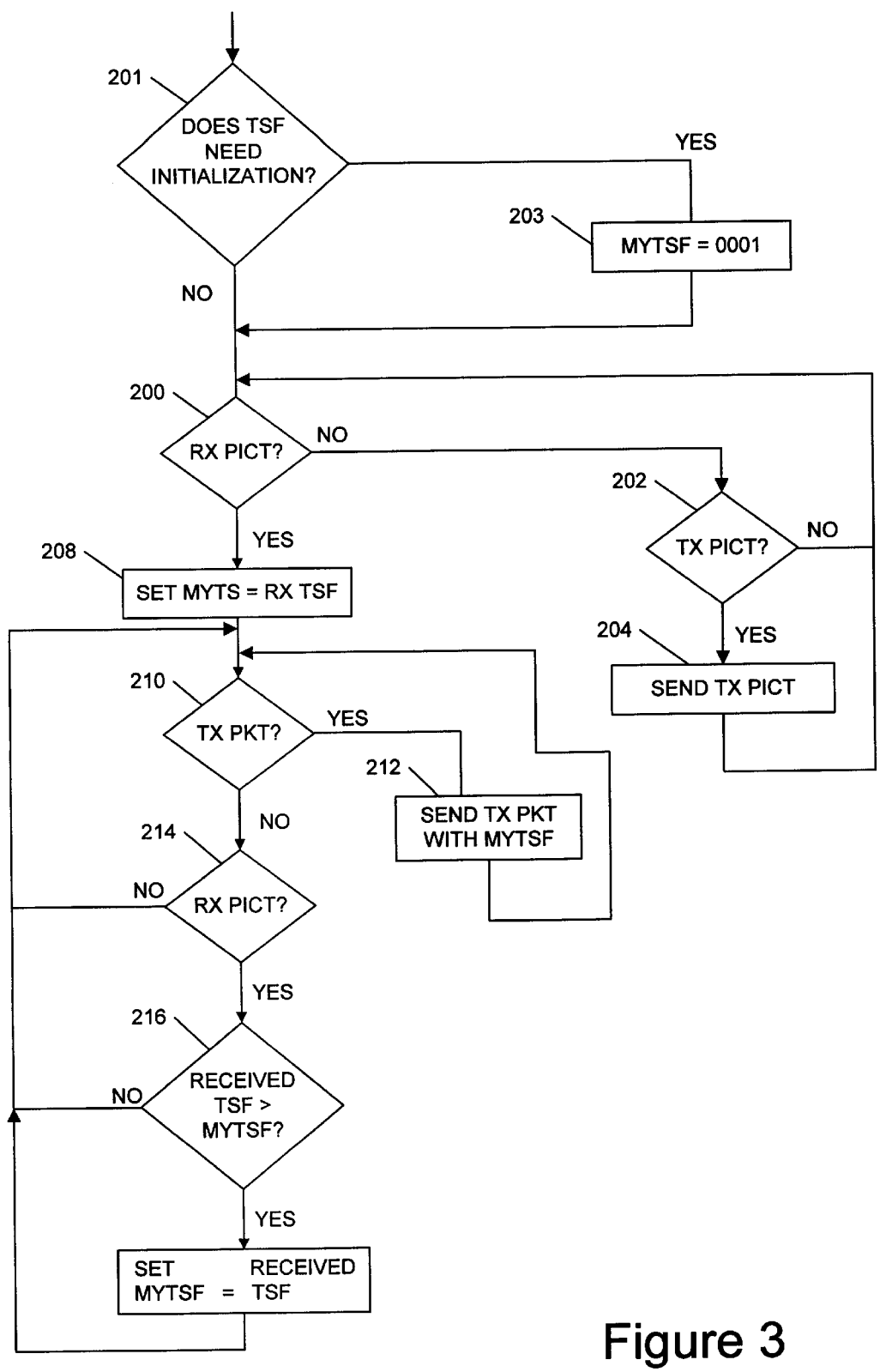
FIG. 3 illustrates a flow diagram of a synchronization process in accordance with the present invention.

In providing synchronization among units in a WLAN, preferably the local clock 172 within each unit is utilized in conjunction with a designated field within a received packet, as discussed hereinbelow with reference to FIGS. 3 and 4. FIG. 3 illustrates an overall flow diagram of how synchronization occurs in a preferred embodiment of the present invention. The first mode is to "create" a WLAN with time synchronization, initializing this local timer to 0001. That mode also establishes the TLOP and TTRM values which other modes "join". Initially a determination is made as to whether a group for the WLAN is to be formed. Thereafter, a determination is made whether time synchronization function should be initialized, via step 201. If initialization is necessary, then the TSF of the unit (MYTSF) is set to 0001, via step 203. If initialization is needed or after the initialization process is not needed then the unit can establish itself as part of a communication group within a WLAN, e.g., establish a valid LAN ID number from an end station currently participating in a communication group, and not yet synchronized. When synchronization is desired, the process of synchronizing initiates by determining whether a packet has been received at the unit (step 200). When no packet is received, a determination of whether the unit is transmitting a packet occurs (step 202). If not, the unit returns to the receipt determination step 200. If the unit is transmitting a packet (step 202 is affirmative), the packet being transmitted includes the value from a time synchronization field register within the unit in a time synchronization field (TSF) of the packet (step 204), as discussed with reference to FIG. 4.

Figure 4:
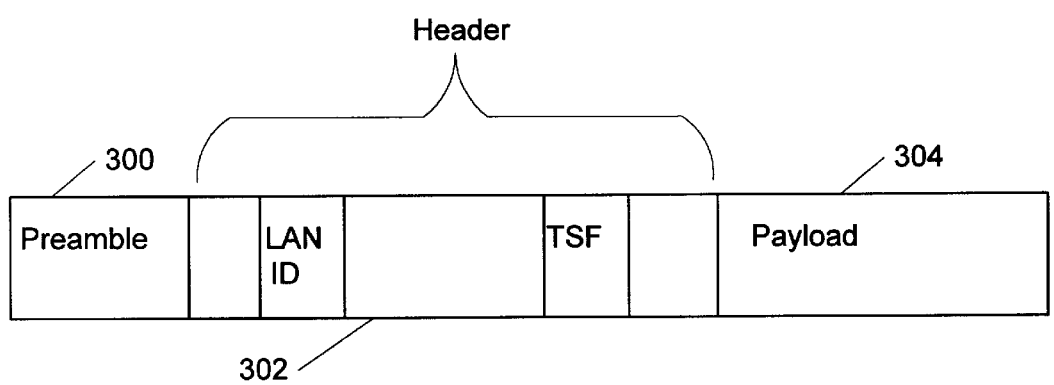
FIG. 4 illustrates a packet including synchronization information in accordance with a preferred embodiment of the present invention.

Referring to FIG. 4, a packet suitably includes a preamble portion 300, a header portion 302, and a payload/data portion 304. Included within the header portion 302 is a field for group identification, LAN ID, and a field for the TSF register value of the transmitting unit to support synchronization among the units of a WLAN communication group, TSF. Of course, although the TSF is shown as a part of the header, the TSF may be included in another portion of the packet if desired without departing from the spirit and scope of the present invention. The value inserted into the TSF is suitably contained within a dedicated field register for time synchronization. For example, the field register is suitably a 16-bit register within the transmit/receive control logic unit 174 (FIG. 2), wherein a 0H value suitably indicates that the unit does not have a valid TSF value for time synchronization, while a value in the range of 0001H-FFFFH indicates that the unit is functional for time synchronization.

Figure 2:
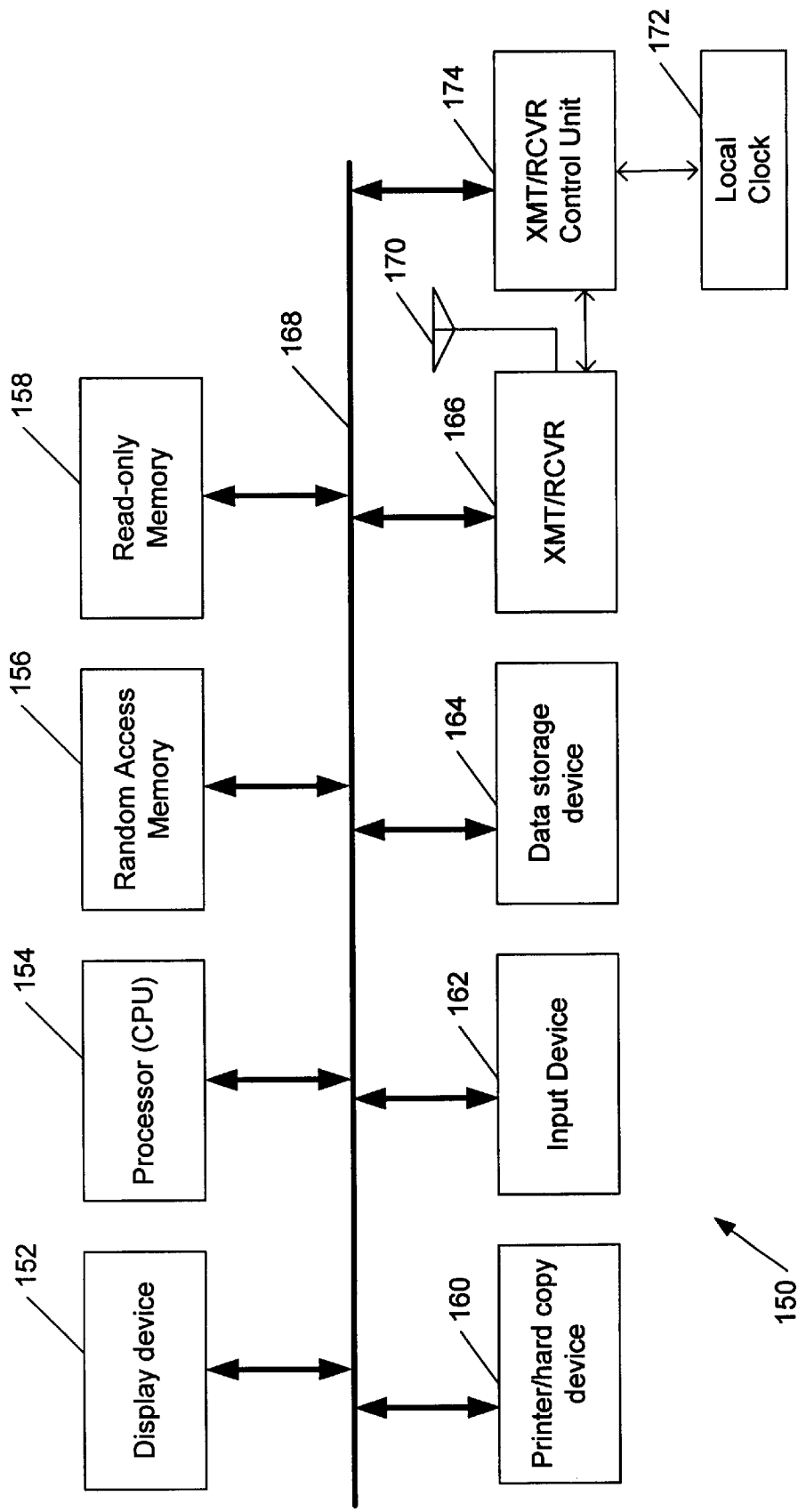
FIG. 2 illustrates a block diagram of a computer system suitable for use within a WLAN.

Further, the rate at which the value within the TSF register advances is preferably controlled via an associated control register. Suitably, the value within the associated control register is loaded into a count down register, such as a register that counts down every microsecond, with the count-down time increment suitably occurring in accordance with the unit's local clock 172 (FIG. 2). In general, the units within a communication group use the value within the TSF of received packets that have a matching LAN ID to ensure synchronization, as discussed more fully with reference to FIG. 3.

When an initial packet is received by a unit (i.e., step 200 is affirmative), the value of the TSF in the packet (e.g., RXTSF) is suitably inserted into the unit's TSF register (e.g., MYTSF), since the unit is not yet synchronized (step 208). The process continues by determining whether the unit desires a packet transmission (step 210). If so, the value from MYTSF is inserted into the TSF of the transmitted packet (step 212). When the unit does not seek packet transmission, a determination of whether a packet is received is made (step 214). When there is no packet receipt (i.e., step 214 is negative), the process returns to step 210.

When a packet is received (i.e., step 214 is affirmative), the process continues by determining whether the value of MYTSF needs to be updated, i.e., whether the unit receiving the packet and the unit sending the packet are in sync. Thus, the value of the TSF in the received packet is preferably compared to the value in MYTSF of the receiving unit (step 216). When the value of the received TSF is not greater than the value of MYTSF, i.e., the difference between the value of the received TSF and the value of MYTSF is less than or equal to zero, the two units are in sync and no updating of MYTSF is needed. The process then returns to step 210. When the value of the received TSF is greater than the value of MYTSF, i.e., the difference between the value of the received TSF and the value of MYTSF is greater than zero, the process continues by updating the value of MYTSF to be equal to the value of the received TSF (step 218) to synchronize the receiving unit with the sending unit. The process then returns to step 210.

With the capability to provide synchronization among units in a WLAN, more specific communication limits and varying modes of communication among different types of units can be accommodated. By way of example, first, second, and third modes of communication may be defined that utilize communication periods based on the predetermined values of the synchronized TSF registers. These communication periods suitably provide agreed upon time points that varying types of data transmission and unit types are to occur.

Figure 5A:
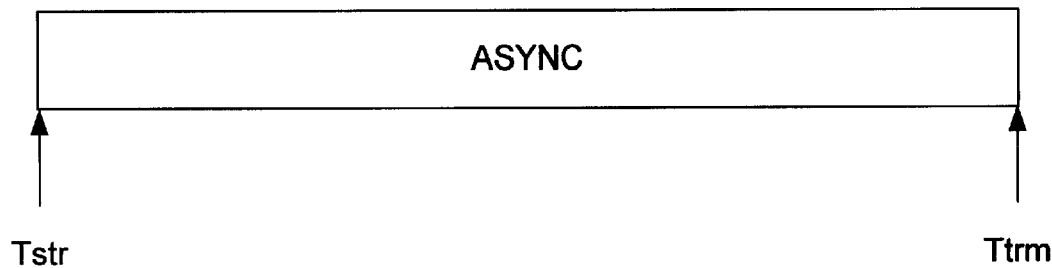
FIGS. 5a–5e illustrate framing timing according to various modes of communication utilizing synchronization information.

In a first mode of operation, operating units are suitably non-power saving type units that perform asynchronous communication, i.e., data exchange from one unit to another with a positive or negative acknowledge, as is well understood by those skilled in the art. The first mode preferably provides a default mode in which the TSF is used for basic time synchronization. FIG. 5a illustrates framing timing for the first operational mode with a start time, Tstr, and a terminating time, Ttrm. Suitably, with a 16-bit register provided as the TSF register, the range of framing timing runs from 0001H to FFFFH. However, the maximum range can be limited by Ttrm (return to 0001).

The second and third modes of operation are similar in nature due to the definition of particular time periods during which certain activities occur. However, a second mode is designed mainly for units that are powered to be operational at all times, i.e., non-power saving units, while a third mode is designed for units that have power saving operations and/or units that are non-power saving but operate within a group including power saving units. The synchronization function utilizing the TSF is then preferably used to establish definitive time periods for specific activities within the different unit types during the different modes of operation.

Figure 5B:
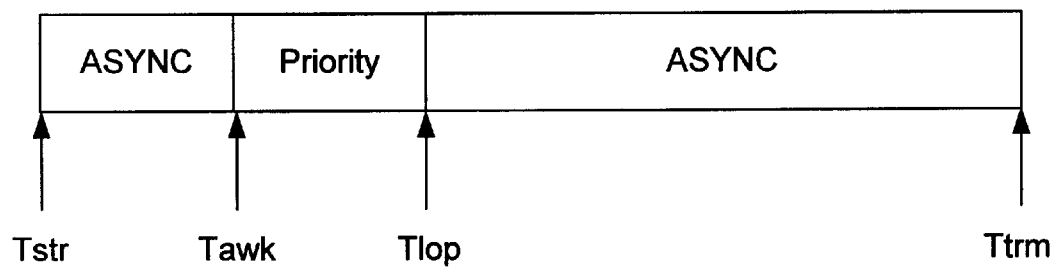
Figure 5C:
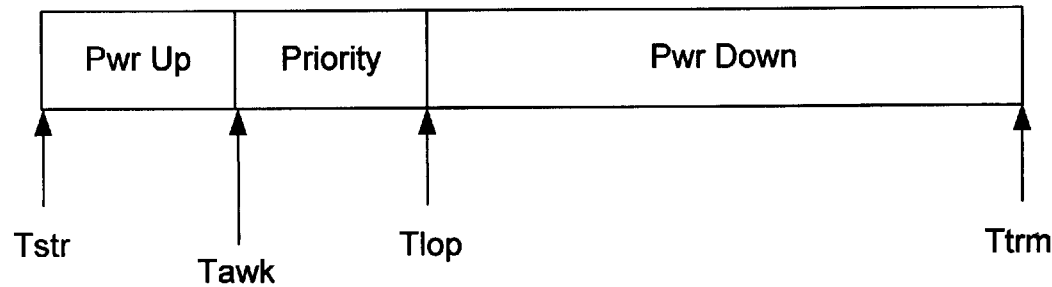

FIGS. 5b and 5c illustrate framing timing for the second and third communication modes, respectively. From the viewpoint of a unit operating according to the second mode, there are two periods of communication, low priority and high priority. The high priority period suitably corresponds with a time for reserve bandwidth data transmission or for priority transmission. Reserve bandwidth or high priority data transmission suitably refers to transmission of real-time data, such as voice and video, as is well understood by those skilled in the art. The low priority period then suitably corresponds with non-reserve bandwidth time, which allows basic asynchronous type of transfers to occur. Thus, those units not having high priority data hold back data transmission during the high priority period. The use of the synchronized TSF suitably allows each of the units to know when these preestablished time points occur, so that appropriate usage of the high and low priority periods occurs. As shown in FIG. 5b, the high priority period occurs from Tawk (awake time) to Tlop (low priority time), while the low priority period occurs from Tstr to Tawk and Tlop to Ttrm, with Ttrm rolling over to Tstr when the maximum value in the TSF register is reached. Suitably, the values which designate Tawk and Tlop are predetermined according to specific network needs and established as buffer values within specific buffer locations of the transmit/receive control unit 176 (FIG. 2). Further, separate transmission buffers within the control unit 176 are preferably provided to store high and low priority data for separate utilization during high and low priority periods.

Similar to the second mode, the third mode of operation also utilizes a specific period of operation. Thus, the high priority period in the third mode of operation designates a predetermined period for communication with a power-saving type unit. The high priority period therefore establishes when a power-saving type unit sends out and receives data. Any data to be sent to the power saving units during the high priority period suitably resides in the high priority (i.e., reserve bandwidth) buffer of the sending unit. In the timing framing for the third mode of operation as shown in FIG. 5c, the high priority period comprises the period from Tawk (awake time) to Tlop (low priority time).

Figure 5D:
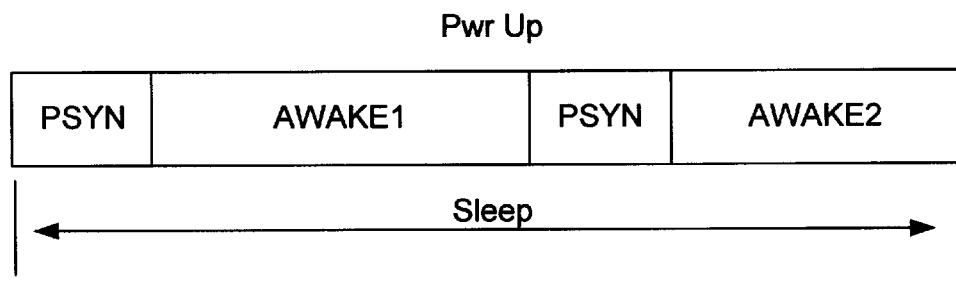
Figure 5E:
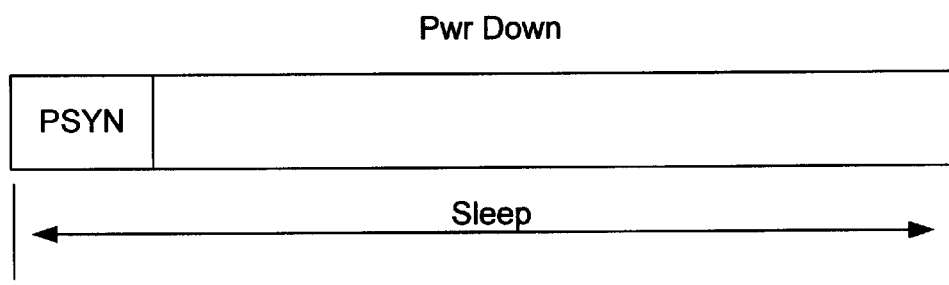

In terms of a power savings unit, the low priority periods are designated for power up, and power down, sleep activities for the unit. Preferably, the point at which Tawk occurs is dependent upon the time necessary for a power saving unit to go from a sleep mode to an awake mode of operation. As shown in FIG. 5d, the power up time incorporates the time required to program the synthesizer (PSYN) to a tristate mode, the time the synthesizer requires to make the state change (AWAKE1), the time required to program the synthesizer again to its final operating state (PSYN), and the time required to get the synthesizer locked at frequency (AWAKE2). The power down time incorporates the time necessary for programming the synthesizer with the power down commands (PSYN) with the unit then entering sleep mode for the duration of the time period, i.e., until the value of Ttrm is reached, as shown in FIG. 5e. Of course, as mentioned above, during these low priority periods, units operating according to the second mode still transmit data to other non-power saving units from the low priority data buffers.

Thus, through the utilization of synchronized units in a WLAN, power-saving units have a definitive window during which active communication readily occurs. Further, the predefined and recognized high priority time period allows other unit types requiring reserved bandwidth communication to gain deferential access to the network. This in turn defines low priority periods for asynchronous traffic to still occur before and after the high priority window. These time periods are capably maintained by the time synchronization aspects of the present invention. Thus, a straightforward and effective manner of providing and utilizing synchronization within a WLAN is efficiently achieved.

Although the present invention has been described in accordance with the embodiments shown, one of ordinary skill in the art will recognize that there could be variations to tho embodiment and those variations would be within the spirit and scope of the present invention. Accordingly, many modifications may be made by one of ordinary skill without departing from the spirit and scope of the present invention, the scope of which is defined by the following claims.

What is claimed is:

1. A method for achieving synchronization among at least two end stations in a communication group of a wireless local area network (WLAN), the method comprising:

receiving a packet with a time synchronization field value from a first end station of the at least two end stations by a second end station of the at least two end stations of the communication group; and comparing upon receipt of the packet the time synchronization field value with a local time value in the second end station to determine whether the local time value requires updating to maintain synchronization between the first and second end stations without requiring maintenance of communication with a master node end station by the first and second end stations.

2. The method of claim 1 wherein the step of comparing determines whether the time synchronization field value is not greater than the local time value.

3. The method of claim 2 wherein when the time synchronization field value is greater than the local time value, the local time value is updated to the time synchronization field value.

4. The method of claim 2 wherein when the time synchronization field is not greater than the local time value, the local time value is not updated.

5. The method of claim 1 wherein when the time synchronization field value is zero, the second end station ignores the time synchronization field value.

6. The method of claim 1 wherein the time synchronization field value comprises a sixteen bit data value.

7. A system for achieving sychronization in a wireless local area network (WLAN), the system comprising:

at least two end stations, wherein each of the at least two stations further comprises:
a local clock unit; and
a transit/receive control unit coupled to the local clock unit, the transmit/recieve control unit including a time synchronization field register for storing a value of the local clock unit;

wherein one of the at least two end stations compares a time synchronzation field register value of a packet upon reciept from another of the at least two end stations with a value of the local clock unit to determine wheter updating of the local clock unit is necessary without requiring maintenance of communication with a master node end station by the at least two end stations.

8. The system of claim 7 wherein when the time synchronization field register value is greater than the local clock unit value, the time synchronization field register is updated to the time synchronization field register value.

9. The system of claim 8 wherein when the time synchronization field register value is not greater than the local clock unit value, the time synchronization field register is not updated.

10. A system for achieving synchronization in a wireless local area network (WLAN), the system comprising:

at least two end stations, wherein each of the at least two end stations further comprises:
a local clock unit; and
a transmit/receive control unit coupled to the local clock unit, the transmit/receive control unit including a time synchronization field register for storing a value of the local clock unit;

wherein one of the at least two end stations compares a time synchronization field register value of a packet upon reception from another of the at least two end stations with a value of the local clock unit to determine whether updating of the local clock unit is necessary such that when the time synchronization field register value is greater than the local clock unit value, the time synchronization field register is updated to the time synchronization field register value and the at least two end stations utilize the time synchronization field register to track duration of high priority and low priority traffic periods.

11. The system of claim 10 wherein the at least two end stations limit packet transmission to high priority data during the high priority traffic period.

12. The system of claim 11 wherein the high priority data further comprises reserve bandwidth data.

13. The system of claim 12 wherein the reserve bandwidth data further comprises real-time data, the real-time data including video data and audio data.

14. The system of claim 11 wherein the high priority data further comprises data for end stations with power-saving mechanisms.

15. The system of claim 11 wherein the at least two end stations limit packet transmission to asynchronous transmissions during the low priority traffic period.

16. A method for utilizing predetermined communication parameters to support varying communication modes in a WLAN, the method comprising:

maintaining synchronization in the WLAN between at least two end stations;

providing a starting time and ending time of a high priority traffic period for the synchronized at least two end stations; and performing asynchronous data transfer between the synchronized at least two end stations before and after the high priority traffic period.

17. The method of claim 16 wherein the starting time occurs after a time period sufficient to allow a power-saving end station to reach an awake state of operation.

18. The method of claim 16 wherein the high priority traffic period provides a sufficient period for reserve bandwidth data transfer to occur.

19. The method of claim 16 wherein maintaining synchronization further comprises receiving a packet with a time synchronization field value from a first end station in a second end station of the communication group; and comparing upon receipt of the packet the time synchronization field value with a local time value in the second end station to determine whether the local time value requires updating to maintain synchronization between the first and second end stations.

20. The method of claim 19 wherein when the received time synchronization field value is greater than the local time value, the local time value is updated to the received time synchronization field value.

21. A method for utilizing predetermined communication parameters to support varying communication modes in a WLAN, the method comprising:

maintaining synchronization in the WLAN between at least two end stations by receiving a packet with a time synchronization field value from a first end station of the at least two end stations by a second end station of the at least two end stations, and comparing upon receipt of the packet the time synchronization field value with a local time value in the second end station to determine whether the local time value requires updating to maintain synchronization between the first and second end stations;

providing a starting time and ending time of a high priority traffic period for the synchronized at least two end stations; and performing asynchronous data transfer between the synchronized at least two end stations before and after the high priority traffic period.

* * * * *